US009409464B2

(12) United States Patent
Tomkins et al.

(10) Patent No.: US 9,409,464 B2
(45) Date of Patent: Aug. 9, 2016

(54) DYNAMICALLY MANAGING VEHICLE GLASS DIMMING

(71) Applicant: GLOBALFOUNDRIES INC., Grand Cayman (KY)

(72) Inventors: Thomas G. Tomkins, Chapel Hill, NC (US); Corville O. Allen, Morrisville, NC (US); Joel Duquene, Raleigh, NC (US); Henri F. Meli, Cary, NC (US); Gerald G. Tomkins, Chapel Hill, NC (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 419 days.

(21) Appl. No.: 13/870,040

(22) Filed: Apr. 25, 2013

(65) Prior Publication Data

US 2014/0320946 A1 Oct. 30, 2014

(51) Int. Cl.
*B60J 3/04* (2006.01)
*G02F 1/163* (2006.01)

(52) U.S. Cl.
CPC .. *B60J 3/04* (2013.01); *G02F 1/163* (2013.01)

(58) Field of Classification Search
CPC ..... B60J 3/04; G02B 27/01; G02B 2027/014; G02B 2027/0118; G02C 7/101; G02C 2202/18; G02F 1/163; G02F 2201/58; Y02T 10/88
See application file for complete search history.

(56) References Cited

U.S. PATENT DOCUMENTS

| | | | |
|---|---|---|---|
| 5,598,293 A | 1/1997 | Green | |
| 6,580,472 B1 | 6/2003 | Willingham et al. | |
| 7,199,767 B2 * | 4/2007 | Spero | 345/7 |
| 7,505,136 B2 | 3/2009 | Romig et al. | |
| 7,983,817 B2 | 7/2011 | Breed | |
| 8,140,219 B2 * | 3/2012 | Cernasov | 701/36 |
| 8,589,034 B2 * | 11/2013 | Kwok | 701/49 |
| 2003/0168838 A1 * | 9/2003 | Breed et al. | 280/735 |
| 2003/0169213 A1 * | 9/2003 | Spero | 345/7 |
| 2007/0112475 A1 * | 5/2007 | Koebler | B60L 3/12 701/1 |
| 2009/0168185 A1 * | 7/2009 | Augustine | 359/613 |

(Continued)

FOREIGN PATENT DOCUMENTS

DE 102011010947 A1 * 8/2012 ........... B60J 3/04

OTHER PUBLICATIONS

Petraglia, "SPD Smart Glass Electronics Overview", www.SPDControlSystems.com, Jun. 14, 2007,published on the world wide web at: http://www.spdcontrolsystems.com/Docs/SPD Electronics Overview.pdf.

(Continued)

*Primary Examiner* — Thomas G Black
*Assistant Examiner* — Ce Li
(74) *Attorney, Agent, or Firm* — Scully Scott Murphy and Presser

(57) ABSTRACT

A method, system or computer usable program product for dynamically changing transparency of portions of a vehicle transparent material including determining a location of a bright light with respect to a vehicle; determining a driver location within the vehicle; selectively changing a transparency of a selected portion of the vehicle transparent material to obscure the bright light from the driver's eyes, while allowing a majority of the vehicle transparent material to remain normally transparent; and repeating the above steps continually to adjust a location of the selected portion of the vehicle transparent material as the vehicle changes orientation with respect to the bright light.

16 Claims, 5 Drawing Sheets

(56) References Cited

U.S. PATENT DOCUMENTS

| | | | |
|---|---|---|---|
| 2010/0094501 A1* | 4/2010 | Kwok | 701/36 |
| 2012/0019891 A1* | 1/2012 | Dewell | 359/275 |
| 2014/0022390 A1* | 1/2014 | Blank | B60R 1/12 |
| | | | 348/148 |

OTHER PUBLICATIONS

"Innovative Glass—Automotive", www.innovativeglasscorp.com, 2006, published on the world wide web at: http://www.innovativeglasscorp.com/auto.htm.

Pham, "Smart Sunglasses use LCD Technology to Block out the Sun's Glare", www.inhabitat.com, Jul. 25, 2011, published on the world wide web at: http://inhabitat.com/%E2%80%9Csmart%E2%80%9D-sunglasses-use-lcd-technology-to-block-out-the-suns-glare/.

"Electrochromic Glass", www.worldofglasses.com, Dec. 4, 2009, found on the world wide web at: http://worldofglasses.wordpress.com/2009/12/04/electrochromic-glass/.

"dVitral—electrochromic glass", www.interactivearchitecture.org, Mar. 11, 2006, found on the world wide web at: http://www.interactivearchitecture.org/dvitral-electrochromic-glass.html.

"How to use your Visormates", www.visorrnates.com, 2009-2012, found on the world wide web at: http://www.visormates.com/Photos.html.

"Smart glass", www.wikipedia.org, found on the world wide web at: http://en.wikipedia.org/wiki/Smart_glass.

"Smart Auto Glass: Voltage-Triggered Glass that Changes Colour with the Press of a Button", www.windshieldreplacementphoenix.org, Aug. 8, 2011, found on the world wide web at: http://www.windshieldreplacementphoenix.org/auto-glass/smart-auto-glass-voltage-triggered-glass-that-changes-colour-with-the-press-of-a-button.

* cited by examiner

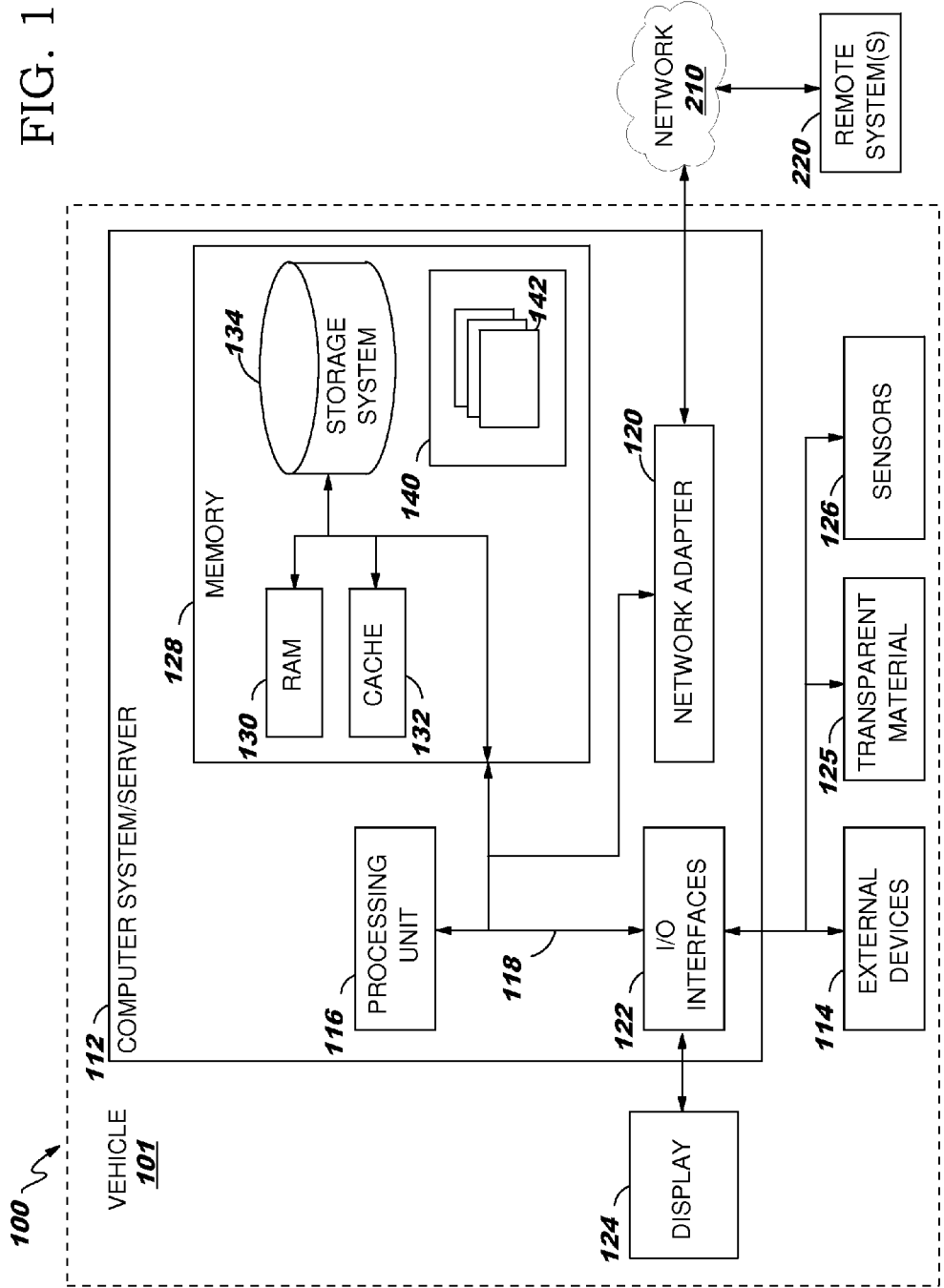

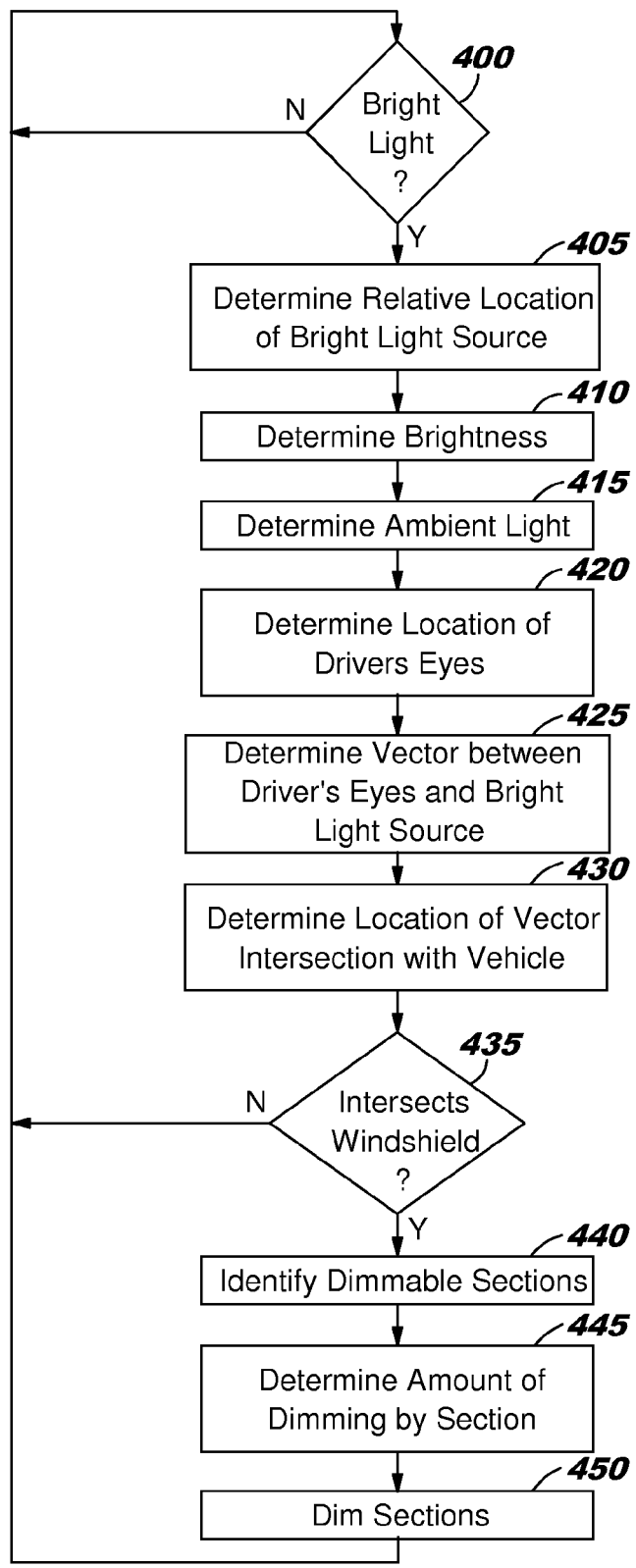

| | 701 | 702 | 703 |
|---|---|---|---|
| 705 | Occupant 1 | Location | Eyes Location |
| 710 | Occupant 2 | Location | Eyes Location |
| 715 | Ambient | Brightness | |
| 720 | Light Source 1 | Brightness | Direction |
| 725 | Light Source 2 | Brightness | Direction |
| 730 | Vector 1 | Description | Section |
| 735 | Vector 2 | Description | Section |
| 740 | Vector 3 | Description | Section |
| 745 | Vector 4 | Description | Section |

DYNAMICALLY MANAGING VEHICLE GLASS DIMMING

BACKGROUND

1. Technical Field

The present invention relates generally to managing vehicle glass dimming, and in particular, to a computer implemented method for dynamically changing transparency of portions of a vehicle transparent material in response to external light sources.

2. Description of Related Art

Various types of technologies exist for tinting, dimming or otherwise changing the transparency of transparent materials on demand such as glass, thereby controlling the amount of light and heat transmitted through the transparent material. These technologies are generally referred to as smart glass or switchable glass and are utilized in a variety of settings and for various purposes. These technologies may be utilized by a variety of vehicles such as automobiles, trucks, airplanes and trains and may be utilized in windows, skylights and mirrors. The dimming may be utilized for purposes of privacy, security, comfort, etc.

There are several technologies utilized for dimming glass on demand including electrochromic devices, suspended particle devices, micro-blinds, and liquid crystal devices. Most of these technologies utilize the application of an electric field through a transparent material such as glass for dimming. Each of these technologies has different advantages and disadvantages depending on the application. For example, electrochromic devices may switch slowly, but do not require a continuous application of an electric field to maintain a dimmed or a transparent state.

A variety of technologies exist for detecting faces and eyes of people. Facial recognition technology generally starts with identifying a person's face, then locating various portions of the face including the eyes for determining that person's biometrics. Some modern digital cameras will detect faces and eyes for improving portraits and reducing red-eye when a flash is used.

SUMMARY

The illustrative embodiments provide a method, system, and computer usable program product for dynamically changing transparency of portions of a vehicle transparent material including determining a location of a bright light with respect to a vehicle; determining a driver location within the vehicle; selectively changing a transparency of a selected portion of the vehicle transparent material to obscure the bright light from the driver's eyes, while allowing a majority of the vehicle transparent material to remain normally transparent; and repeating the above steps continually to adjust a location of the selected portion of the vehicle transparent material as the vehicle changes orientation with respect to the bright light.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 1 is a block diagram of a data processing system in which various embodiments may be implemented;

FIG. 3 is a flow diagram of the operation of a system for dynamically changing transparency of selected portions of a vehicle glass or other transparent material for a driver in response to an external light source in accordance with a first embodiment;

DETAILED DESCRIPTION

Figure 2A:
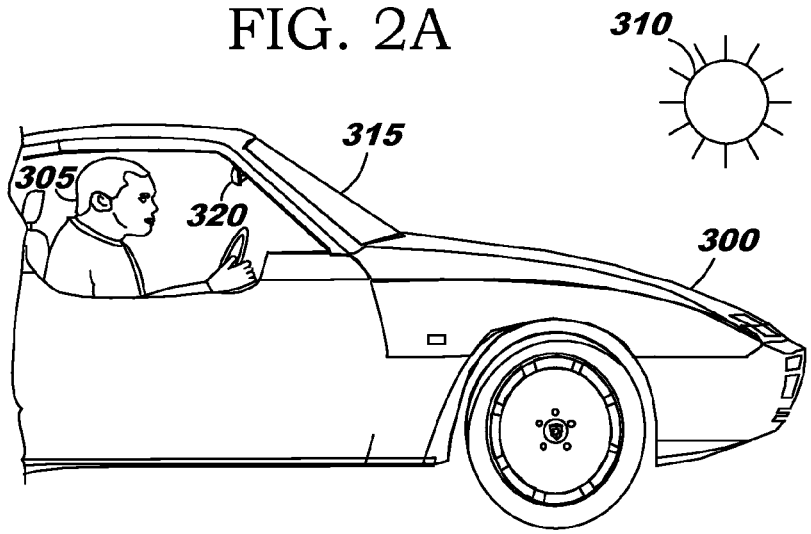
FIGS. 2A through 2C are illustrations of the utilization of a vehicular windshield of which the transparency of selected portions can be dynamically adjusted in which various embodiments may be implemented.

Processes and devices may be implemented and utilized to dynamically manage vehicle glass dimming. These processes and apparatuses may be implemented and utilized as will be explained with reference to the various embodiments below.

FIG. 1 is a block diagram of a data processing system in which various embodiments may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein.

In data processing system 100 incorporated in vehicle 101 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in vehicle 101 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for dynamically managing vehicle glass dimming.

Computer system/server 112 may also communicate with one or more external devices 114 such as a keyboard, a pointing device, a display 124, transparent material 125, sensors 126, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Network adapter 120 can also communication with other remote system(s) 220 across a network 210. For example, the network adapter may connect through a cellular or other wireless connection through the internet to other systems or the cloud. This communication may be utilized for downloading local information such as local terrain information, location of the sun based on time of day and exact location, or for downloading software capable of performing the various functions described below.

Figure 2B:
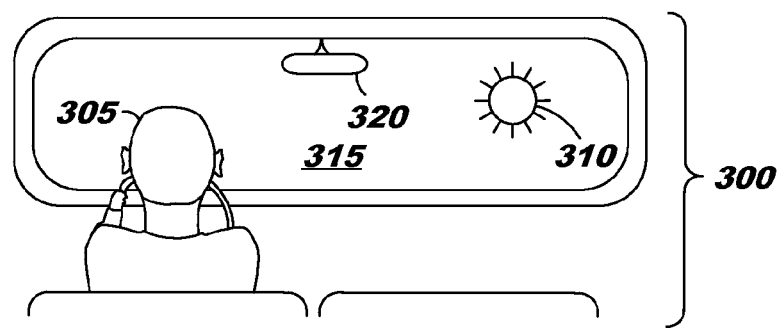
Figure 2C:
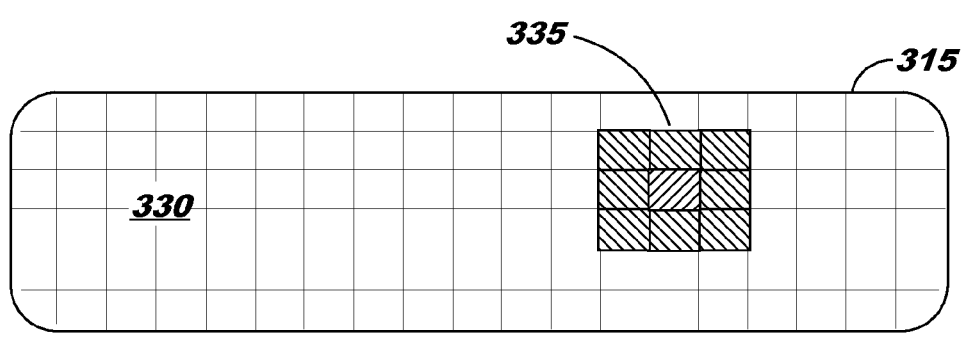

FIGS. 2A through 2C are illustrations of the utilization of a vehicular windshield of which the transparency of selected portions can be dynamically adjusted in which various embodiments may be implemented. Although the below describes dynamically adjusting selected portions of the windshield, other transparent materials may also be similarly adjusted including side windows, rear window, skylight, and mirrors.

FIG. 2A is a side cutaway view of a vehicle 300 with a driver 305 driving in the direction of the sun 310. Sun 310 is a bright light viewable by the driver through windshield 315. Driver also utilizes a rear view mirror 320 to view traffic behind the vehicle. Rear view mirror 320 may include a set of cameras for viewing the location of the driver's eyes in the vehicle and the relative location of the sun or other bright lights to the vehicle. This may be performed by identifying the eyes directly or by identifying the face or head of the driver and estimating the location of the driver's eyes. Identifying the face or head instead of the eyes of a driver may be particularly effective if the driver is wearing sunglasses and the eyes are obscured. While driver 305 is driving in the general direction of the sun, the glare of the sun may cause visual problems for the driver. Depending on the angle and direction of the sun relative to the vehicle and driver, the sun may blind the driver, affect the driver's ability to view the road and other traffic clearly, or just cause some discomfort to the driver's eyes. In addition, the sun may also affect the driver's ability to view behind the vehicle through the rear view mirror.

Alternative embodiments may utilize transducers for identifying the presence and location of a driver and passengers as well as the location of their heads. Other sensors may be utilized such as weight sensors located in the seats, an accelerometer to determine when the vehicle has changed direction of travel, a position sensor to determine whether a side window, sunroof or other movable transparent material is partially or fully open, etc. In addition, seat weight sensors in combination with an average range of heights or a height entered as part of a profile may be utilized to identify the location of a driver or passenger head and eyes. Cameras or other sensors may be located in various fixed locations such as the pillars or on the dashboard. Other sensors may be utilized as desired to better adjust transparency of selected portions of the vehicle transparent materials in response to bright lights for the comfort and safety of the driver and passengers.

FIG. 2B is a rear cutaway view of vehicle 300 with driver 305 driving in the direction of sun 310. The sun in is the right hand side of windshield 315 to the right of rear view mirror 320. As a result, the glare of the sun may cause difficulties in the driver viewing the road ahead and to the right. Rear view mirror 320 may include a set of cameras for viewing the location of the driver's eyes in the vehicle and the relative location of the sun to the vehicle.

FIG. 2C is a rear view of windshield 315 with many portions or sections 330, each of which can be separately dimmable on demand. In this illustration, there is a matrix of about 6 rows and 19 columns of roughly square dimmable sections collectively referred to as a portion of the windshield. Each section may be dimmed electronically as described below. In this example, a portion of the windshield including nine sections 335 are dimmed to reduce glare from the sun in the driver's eyes with the center section dimmed more than the other dimmed sections within the windshield portion, while allowing a majority of the windshield to remain normally transparent. This enhances the driver's comfort and allows the driver to see the road ahead and to the right without undue glare. With the proper amount of dimming, the driver should be able to see objects in the direction and angle of the sun that the driver could not see without such dimming to significantly block the bright light and reduce the surrounding glare.

Various technologies may be utilized for selectively dimming glass or other transparent materials on demand including electrochromic devices, suspended particle devices, micro-blinds, and liquid crystal devices. Most of these technologies utilize the application of an electric field through a transparent material such as a windshield for dimming. The windshield or other vehicular transparent material may include multiple electrodes interspersed throughout for adjusting the dimming of various portions of the windshield upon demand where a portion may include one or more sections. For example, every other corner of a section may be a positive electrode and every alternative corner of a section may be a negative electrode for selectively dimming each section. Alternatively, each section may have insulated borders that enclose a separate sandwiched area for electrochromic activation. In another alternative, the windshield may be a liquid crystal display type device where each section is essentially a large pixel for activation to implement dimming or not.

The amount of dimming may vary for selected sections of the windshield while allowing a majority of the windshield to remain normally transparent. For example, the section between the sun and the driver's eyes may be darkened considerably to significantly block the bright light whereby adjoining sections may be only slightly darkened to reduce the surrounding glare. Although 6 rows and 19 columns of roughly square sections are shown, more or fewer sections may be utilized and alternative arrangements may provide for hexagonal sections, overlapping circular or elliptical sections, as well as other types of sectional arrangements. Although the illustrated example is directed to protecting the vision of the driver, it may also be utilized to protect the vision of a passenger so long as such protection does not affect the driver's ability to see. For example, the sections directly in front of the driver should not be considerably dimmed just for the comfort of a passenger.

Other transparent or reflective elements of the vehicle besides the windshield, collectively referred to as glass or vehicle glass, may be similarly controlled including the side windows, the rear window, any sunroof, and even the mirrors. Although a camera in the rear view mirror is described as being utilized to determine the location of the driver's eyes in the vehicle, cameras may be utilized in other locations and other types of detection may be utilized. For example, the driver may simply wear a pair of glasses or other head worn device with RFIDs (radio frequency identification) for use in determining the location of the driver's eyes within the vehicle. Although the example described visual issues caused by the sun, other types of bright lights may be detected and responded to with windshield dimming including oncoming headlights of other vehicles.

FIG. 3 is a flow diagram of the operation of a system for dynamically changing transparency of selected portions of a vehicle glass or other transparent material for a driver in response to an external light source in accordance with a first embodiment. Although this first embodiment is illustrated with a single vehicle occupant (the driver) and a single bright light (the sun) for ease of discussion, the embodiment can easily be expanded to multiple occupants and multiple bright lights. Although the following steps are shown in sequence, many of the steps may be performed in parallel. For example, steps 405-420 below may be performed in parallel utilizing different or even shared sensors.

In a first step 400, the system determines whether there may be a bright light source that may cause issues for the vehicle driver. This may be performed by an outward facing set of cameras that can detect bright lights. Alternatively, a matrix of light sensors (similar to an insect's compound eyes) or other sensors may be utilized to determine whether bright lights may be an issue. If not, then processing returns to step 400 where it is repeated until a bright light source is detected. If yes, then processing continues to step 405 where the relative location of the bright light source is determined relative to the vehicle. For example, the bright light may be ahead and to the left of the vehicle (e.g. 26 degrees to the left of the front of the vehicle) and just above the horizon (14 degrees above the plane of the vehicle). This can be determined by the use of the camera or other sensors described above with reference to step 400. Subsequently in step 410 a more precise measure of the brightness of the light source is determined. This may be utilized to determine how much dimming is needed in selected portions of the windshield to block the light source from the driver's eyes and to reduce glare. Then in step 415 the brightness of the ambient light is determined relative to the bright light source. For example a medium bright light on a dark night may be a greater visual problem than a bright light during the middle of the day. This information can be utilized to determine the amount of dimming required. A separate sensor may be utilized for identifying the ambient light levels or the same sensors for detecting bright lights may also be utilized. At this point, in an alternative embodiment, a more precise decision could be made whether to dim the windshield than in step 400 given the detailed information collected.

Subsequently in step 420, the location of the driver's eyes in the vehicle is determined. This can be by direct determination of the location of the driver's eyes or by a determination of the location of the driver's face or head and an estimation of the location of the driver's eyes. This location can be determined by the use of an inward facing set of cameras. If the set of cameras are to an angle from the driver, then stereoscopic cameras or multiple cameras may be utilized to determine the three dimensional location of the drivers eyes in the vehicle. Alternative methods of determining the location of the driver's eyes include using a set of RFID glasses worn by the driver, an ultrasonic sonar based system within the vehicle, etc. A determination utilizing analysis such as pattern matching of an internal camera picture or video may also be made whether the driver is wearing sunglasses and the amount of tinting of the sunglasses, which could affect the amount of dimming required. For example, if the driver's eyes are partially or totally obscured, the driver may be wearing sunglasses and the sunglasses may be dark or lighter in color (e.g. amber). With this location information, a vector running between the detected bright light and the driver's eyes is determined in step 425. Then in step 430, the intersection of the vector with the vehicle is determined to identify the intersecting glass section or sections between the bright light and the driver's eyes. In step 435, this intersection is then used to determine whether the vector intersects with a dimmable windshield or other dimmable glass of the vehicle. If not, then processing returns to step 400, otherwise processing continues to step 440. In step 440, the intersection of the vector with the dimmable glass is utilized to identify the intersecting glass section or sections between the bright light and the driver's eyes. In step 445, the relative brightness of the bright light to the ambient light is utilized to determine how much to dim the intersecting glass sections and whether to partially dim the surrounding glass sections. Another factor which may be utilized in determining the amount of dimming is whether the driver is wearing sunglasses and the tinting of the sunglasses. In step 450, the glass sections forming a small selected portion of the windshield are then dimmed in accordance with this determination while allowing a majority of the windshield to remain normally transparent. A user interface may also be provided to allow the user to adjust the amount of dimming. This interface could be an adjustable knob, voice command, or a user interface through a touch screen map display, or other type of interface. Processing then returns to step 400 above for a repeat of this process as the vehicle may be moving and continuous adjustments may be needed.

Figure 4:
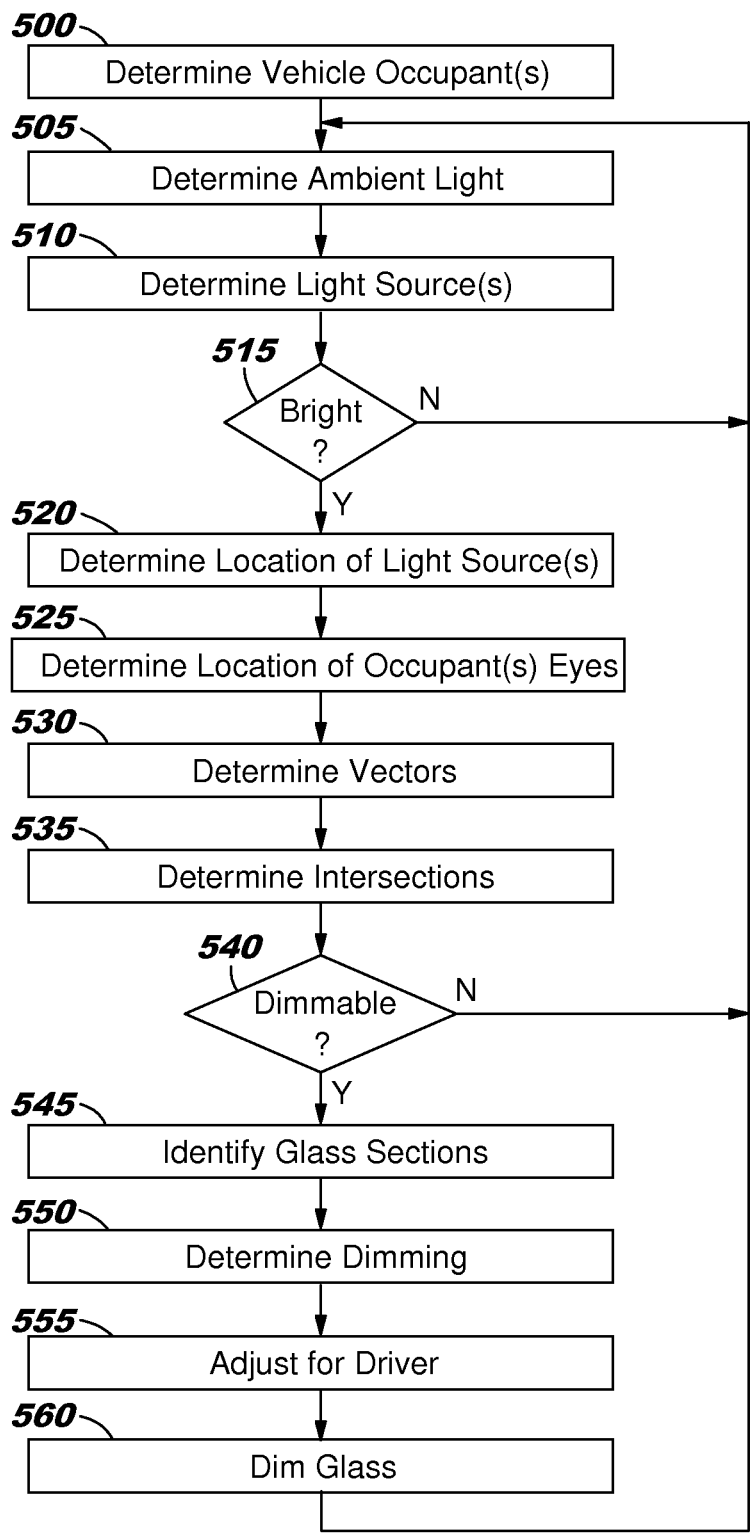
FIG. 4 is a flow diagram of the operation of a system for dynamically changing transparency of selected portions of a vehicle glass or other transparent material for vehicle occupants in response to one or more external light sources in accordance with a second embodiment.

FIG. 4 is a flow diagram of the operation of a system for dynamically changing transparency of selected portions of a vehicle glass or other transparent material for vehicle occupants in response to one or more external light sources in accordance with a second embodiment. This process may be restarted each time the vehicle is started or moved from "Park" to "Drive". Although the following steps are shown in sequence, many of the steps may be performed in parallel. For example, steps 505-510 below may be performed in parallel utilizing parallel sensors.

In a first step 500, the system determines the number and general location of vehicle occupants. This may be performed using a set of internal cameras or other sensors such as seat weight sensors. This information is stored in a database for later use. In a second step 505, the brightness of the ambient light is determined. That is, the general brightness of the surrounding conditions may be important in determining whether a light source is too bright or in determining the amount of dimming needed. This information is also stored to the database.

In a third step 510, it is determined whether there may be one or more bright light sources that may cause issues for the vehicle occupants. These light sources may be lights from other vehicles, the sun, reflections off of objects, etc. This determination includes determining the brightness of each light source. This may be performed by an outward facing set of cameras that can detect bright lights. Alternatively, a matrix of light sensors (similar to an insect's compound eyes) or other sensors may be utilized to determine whether bright lights may be an issue. This information is also stored to the database. Subsequently in step 515 it is determined whether any of these light sources are sufficiently bright relative to the ambient light brightness to potentially cause visual issues with the vehicle occupants. If not, then any previously dimmed sections are turned off (dimming stopped) and processing returns to step 505 where the above steps are repeated until one or more bright light source is detected. If yes, then processing continues to step 520.

In step 520, the location of the bright light source(s) is determined relative to the vehicle and stored in the database. For example, one bright light may be ahead and to the right of the vehicle (e.g. 15 degrees to the right of the front of the vehicle) and above the horizon (21 degrees above the plane of the vehicle). This can be determined by the use of the camera or other sensors described above. Subsequently in step 525, the location of the occupant's eyes in the vehicle is determined and stored in memory such as within a three dimensional grid describing the vehicle cabin. This can be by direct determination of the location of the occupant's eyes or by a determination of the location of the occupant's face or head and an estimation of the location of the occupant's eyes. This location can be determined by the use of an inward facing set of cameras. If the set of cameras are to an angle from an occupant, then stereoscopic cameras or multiple cameras may be utilized to determine the three dimensional location of the occupant's eyes in the vehicle. Alternative methods of determining the location of the occupant's eyes include using a set of RFID glasses worn by an occupant, an ultrasonic sonar based system within the vehicle, etc. A determination may also be made whether the driver is wearing sunglasses and the amount of tinting of the sunglasses, which could affect the amount of dimming required.

Figures 5, 6:
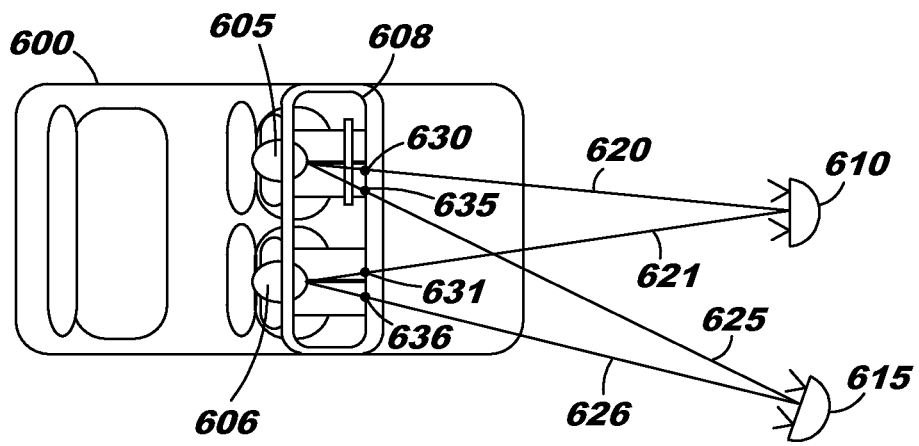
FIG. 5 is an overhead cutaway view of a vehicle with multiple occupants viewing multiple bright objects through a windshield in which various embodiments may be implemented.
FIG. 6 is a block diagram of a database which may be utilized for dynamically changing transparency of selected portions of a vehicle glass or other transparent material in which various embodiments may be implemented.

With this information, a set of vectors running from each detected bright light to each occupant's eyes is determined in step 530 and as shown in FIG. 5 below. Then in step 535, the intersection of each vector with the vehicle exterior is determined. In step 540, these intersections are then used to determine whether any of the vectors intersects with a dimmable windshield or other dimmable glass of the vehicle. If not, any previously dimmed sections are turned off (dimming stopped) and processing returns to step 505, otherwise processing continues to step 545. In step 545, the intersection of the vector with the dimmable glass is utilized to identify the intersecting glass section or sections between the bright light and the driver's eyes. In step 550, the relative brightness of the bright light to the ambient light is utilized to determine how much to dim the intersecting glass sections and whether to partially dim the surrounding glass sections. Another factor which may be utilized in determining the amount of dimming is whether the occupant is wearing sunglasses and the tinting of the sunglasses. In step 555, it is determined whether any dimming of glass sections for a passenger may interfere with the vision for the driver, as the driver's vision takes precedence. If so, then the dimming is adjusted accordingly. In step 560, the glass sections forming one or more small selected portions of the windshield are then dimmed in accordance with the above determinations while allowing a majority of the vehicle windshield to remain normally transparent. A user interface may also be provided to allow the user to adjust the amount of dimming. This interface could be an adjustable knob, voice command, or a user interface through a touch screen map display, or other type of interface. Processing then returns to step 505 above for a repeat of this process as the vehicle may be moving and continuous adjustments may be needed.

In an alternative embodiment, other methods of sensing the location of the sun may be utilized. For example, the GPS location of the vehicle in combination with a magnetic setting, level sensing, an accelerometer, etc. may be utilized to determine the exact location, direction, elevation and angle of the vehicle relative to the earth. This information may be utilized with information about the location of the sun which may be calculated from the GPS location, time of day, and time of year. Information about the location of the sun may also be stored in GPS or other memory in a large table, or obtained across the internet (such as through a cellular or Wi-Fi connection) to determine the location of the sun relative to the vehicle. In addition, downloaded or stored maps may be utilized to determine whether there are any obstructions which may block the view of the sun. Furthermore, up to date weather reports may be downloaded and utilized to determine whether clouds may be blocking the brightness of the sun.

FIG. 5 is an overhead cutaway view of a vehicle 600 with multiple occupants 605 and 606 viewing multiple bright objects 610 and 615 through windshield 608 in which various embodiments may be implemented. There are four vectors 620, 621, 625 and 626 shown running from the bright lights to the occupant's eyes. These vectors intersect windshield 608 at points 630, 631, 635 and 636. These intersections may be utilized as described above with reference to FIGS. 3 and 4.

FIG. 6 is a block diagram of a database 700 which may be utilized for dynamically changing transparency of selected portions of a vehicle glass or other transparent material in which various embodiments may be implemented. A first column 701 includes identifiers of the data for each row. A second column 702 includes a first set of data for each item identified in column 701. A third column 703 includes a second set of data for certain items identified in column 701.

The first two rows 705 and 710 include identifiers of the occupants with the driver being the default for row 705. The general location of each occupant is stored in the second column with the exact location of each occupant's eyes stored in the third column. The location of each occupant may simply be a number based on seat location (e.g. 1, 2, 3 or 4) or it may be descriptive (e.g. driver, front passenger, etc.). The location of each occupant's eyes may be in predefined voxels for the vehicle or in other coordinate systems. The next row 715 is the ambient light level with the brightness stored in column two. The brightness may be in lumens or other standard measures.

Rows 720 and 725 include identifiers of the light sources in the first column, the brightness of each light source in the second column, and the location relative to the vehicle in the third column. The location may be stored in a variety of coordinate systems which is utilized to generate vectors from the light sources to the occupant's eyes. Rows 730, 735, 740 and 745 include vectors with an identifier in the first column, a vector description in the second column, and any dimmable section identified in the third column. The vector description may include the direction relative to the vehicle. The dimmable portion includes one or more dimmable glass sections which are intersected by the vector and may be dimmed due to bright light source. Alternative databases may utilize alternative sets of data stored with a variety of scales and measures to implement various embodiments of the invention.

The invention can take the form of an entirely software embodiment, or an embodiment containing both hardware and software elements. In a preferred embodiment, the embodiments are implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system within a vehicle. Server and client data processing systems may include data storage media that are computer usable, such as being computer readable. A data storage medium associated with a server data processing system may contain computer usable code such as for dynamically managing vehicle glass dimming. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers. These can include sensors such as cameras, light sensors, a GPS unit, a dynamically adjustable vehicle windshield or other transparent material, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of dynamically changing transparency of portions of a vehicle transparent material comprising:
    determining a location of a bright light with respect to a vehicle;
    determining a driver location within the vehicle;
    determining a relative brightness of the bright light relative to ambient light;
    selectively changing transparency of a selected portion of the vehicle transparent material to obscure the bright light from the driver's eyes while allowing a majority of the vehicle transparent material to remain normally transparent, wherein the amount of changed transparency is based on the relative brightness of the bright light;
    determining whether the driver is wearing sunglasses, wherein the step of selectively changing transparency is affected by a positive sunglasses determination; and
    repeating the above steps continually to adjust a location of the selected portion of the vehicle transparent material as the vehicle changes orientation with respect to the bright light;
    wherein the method further comprises determining a tinting of the sunglasses and wherein the step of selectively changing transparency is modified by the determined tinting of the sunglasses.

2. The method of claim 1 wherein the vehicle transparent material is a portion of a mirror.

3. The method of claim 1 further comprising:
    determining a passenger location within the vehicle; and
    selectively changing transparency of a second selected portion of the vehicle transparent
material to obscure the bright light from the passenger's eyes unless the second selected portion is directly in front of the driver;
    wherein the step of repeating is also repeated for the above steps.

4. The method of claim 3 further comprising changing transparency of a third and fourth selected portion of the vehicle transparent material in response to a second bright object; wherein determining the driver location includes monitoring a head position of the driver; wherein determining the passenger location includes monitoring a head position of the passenger; wherein each selected portion includes multiple sections, each section changed in transparency selectively, wherein one section may be changed in transparency more than another section within each selected portion; and wherein an interface is provided to the driver to adjust changing transparency of the selected portions.

5. The method of claim 1 wherein the location of the sun as the bright light with respect to the vehicle is determined based on global positioning satellite signals, the current time, and the elevation and angle of the vehicle relative to the earth.

6. The method of claim 1 wherein an interface is provided to the driver to adjust the amount of changed transparency of the selected portion without disabling the changed transparency of a selected portion of the vehicle transparent material.

7. A computer usable program product comprising a non-transitory computer usable storage medium including computer usable code for use in dynamically changing transparency of a portion of a vehicle transparent material, the computer usable code being configured for performing the steps of:
    determining a location of a bright light with respect to a vehicle;
    determining a driver location within the vehicle;
    determining a relative brightness of the bright light relative to ambient light;
    selectively changing transparency of a selected portion of the vehicle transparent material to obscure the bright light from the driver's eyes while allowing a majority of the vehicle transparent material to remain normally transparent, wherein the amount of changed transparency is based on the relative brightness of the bright light;
    determining whether the driver is wearing sunglasses, wherein the step of selectively changing transparency is affected by a positive sunglasses determination; and
    repeating the above steps continually to adjust a location of the selected portion of the vehicle transparent material as the vehicle changes orientation with respect to the bright light;
    wherein the computer usable code is further configured for determining a tinting of the sunglasses and wherein the step of selectively changing transparency is modified by the determined tinting of the sunglasses.

8. The computer usable program product of claim 7 wherein the vehicle transparent material is a portion of a mirror.

9. The computer usable program product of claim 7 wherein the computer usable code is further configured for:
   determining a passenger location within the vehicle; and
   selectively changing transparency of a second selected portion of the vehicle transparent material to obscure the bright light from the passenger's eyes unless the second selected portion is directly in front of the driver;
   wherein the step of repeating is also repeated for the above steps.

10. The computer usable program product of claim 7 wherein the location of the sun as the bright light with respect to the vehicle is determined based on global positioning satellite signals, the current time, and the elevation and angle of the vehicle relative to the earth.

11. The computer usable program product of claim 7 wherein the computer usable code is further configured for providing an interface to the driver to adjust the amount of changed transparency of the selected portion without disabling the changed transparency of a selected portion of the vehicle transparent material.

12. A data processing system for dynamically changing transparency of a portion of a vehicle transparent material, the data processing system comprising:
   a processor; and
   a memory storing program instructions which, when executed by the processor, execute the steps of:
   determining a location of a bright light with respect to a vehicle;
   determining a driver location within the vehicle;
   determining a relative brightness of the bright light relative to ambient light;
   selectively changing transparency of a selected portion of the vehicle transparent material to obscure the bright light from the driver's eyes while allowing a majority of the vehicle transparent material to remain normally transparent, wherein the amount of changed transparency is based on the relative brightness of the bright light;
   determining whether the driver is wearing sunglasses, wherein the step of selectively changing transparency is affected by a positive sunglasses determination; and
   repeating the above steps continually to adjust a location of the selected portion of the vehicle transparent material as the vehicle changes orientation with respect to the bright light;
   wherein the program instructions, when executed by the processor, further execute determining a tinting of the sunglasses and wherein the step of selectively changing transparency is modified by the determined tinting of the sunglasses.

13. The data processing system of claim 12 wherein the vehicle transparent material is a portion of a mirror.

14. The data processing system of claim 12 wherein the program instructions, when executed by the processor, further execute:
   determining a passenger location within the vehicle; and
   selectively changing transparency of a second selected portion of the vehicle transparent material to obscure the bright light from the passenger's eyes unless the second selected portion is directly in front of the driver;
   wherein the step of repeating is also repeated for the above steps.

15. The data processing system of claim 12 wherein the location of the sun as the bright light with respect to the vehicle is determined based on global positioning satellite signals, the current time, and the elevation and angle of the vehicle relative to the earth.

16. The data processing system of claim 12 wherein the program instructions, when executed by the processor, further provide an interface to the driver to adjust the amount of changed transparency of the selected portion without disabling the changed transparency of a selected portion of the vehicle transparent material.

* * * * *